United States Patent [19]
Kashima et al.

[11] Patent Number: 5,647,655
[45] Date of Patent: Jul. 15, 1997

[54] BACK LIGHTING DEVICE

[75] Inventors: Keiji Kashima; Naoki Yoshida, both of Kanagawa, Japan

[73] Assignee: Tosoh Corporation, Yamaguchi, Japan

[21] Appl. No.: 296,491

[22] Filed: Aug. 8, 1994

Related U.S. Application Data

[62] Division of Ser. No. 70,916, Jun. 4, 1993, Pat. No. 5,392,199.

[30] Foreign Application Priority Data

Jun. 4, 1992 [JP] Japan ................... 4-168338

[51] Int. Cl.$^6$ ........................................... F21V 7/04
[52] U.S. Cl. ........................................ 362/31; 362/26
[58] Field of Search ........................ 362/26, 27, 31, 362/32; 385/901; 359/48, 50

[56] References Cited

U.S. PATENT DOCUMENTS

| | | | |
|---|---|---|---|
| 4,043,636 | 8/1977 | Eberhardt et al. | 359/48 X |
| 5,050,946 | 9/1991 | Hathaway et al. | 385/33 |
| 5,392,199 | 2/1995 | Kashima et al. | 362/31 |

FOREIGN PATENT DOCUMENTS

| | | |
|---|---|---|
| 0442529 | 2/1991 | European Pat. Off. . |
| 1246347 | 10/1960 | France . |

Primary Examiner—Stephen F. Husar
Attorney, Agent, or Firm—Sughrue, Mion, Zinn, Macpeak & Seas

[57] ABSTRACT

In a back lighting device for a side light type panel, one end portion of a specular or light diffusing/reflecting film covering a linear light source is bonded to one end portion of a light conducting plate which is on the side of its light emerging surface and is in proximity of the linear light source, and a light diffusing/reflecting film is laid through an air layer on the part of the rear surface of the light conducting plate which corresponds to the junction. The back lighting device of the invention is small in size, large in effective light emitting area when compared with its external dimensions, and excellent in the distribution of luminance. Hence, it can be used as a back light device that is highly efficient in converting power to luminance.

3 Claims, 2 Drawing Sheets

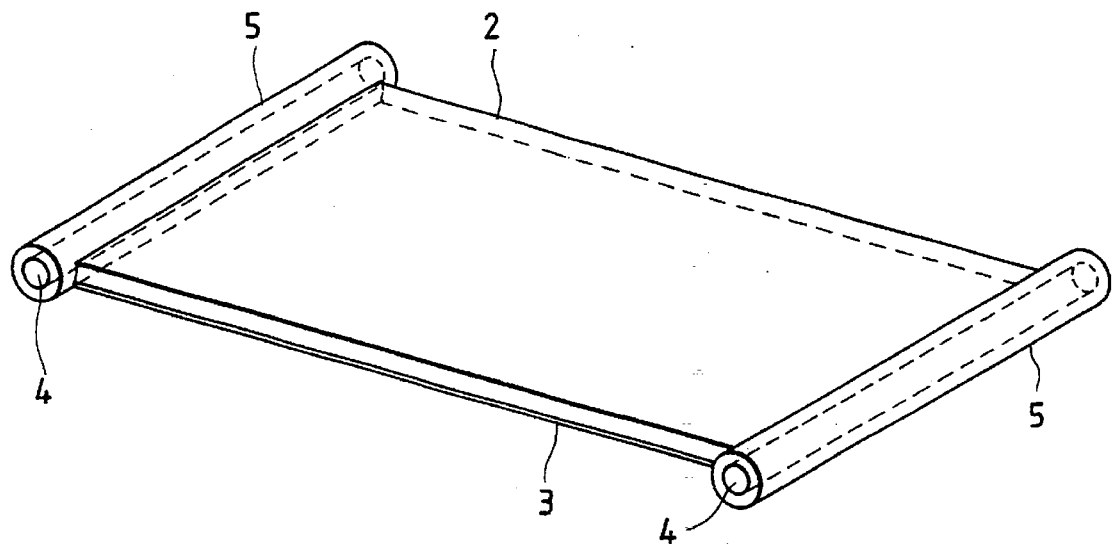
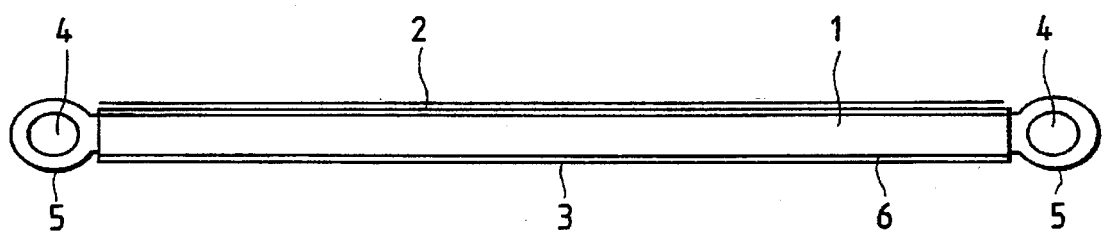

BACK LIGHTING DEVICE

This is a divisional of application Ser. No. 08/070,916 filed Jun. 4, 1993, now U.S. Pat. No. 5,392,199.

BACKGROUND OF THE INVENTION

This invention relates to a back lighting device for illuminating transmissive or semi-transmissive panels from the rear side.

Recently, liquid crystal display devices with a back lighting mechanism which are thin and allow easy viewing of information, have been used with lap-top or book type word processors or computers. The back lighting mechanism in common use adopts an "edge lighting" method in which a linear light source, such as a fluorescent tube, is provided at one end portion of a transmissive light conducting plate as shown in FIG. 1. Further, as shown in FIG. 2, one surface of the light conducting plate is often partially covered with a light diffusing material having a higher refractive index than the material of the light conducting plate, and the one surface thus covered is almost entirely covered with a specular reflecting plate or light diffusing/reflecting plate.

On the other hand, in order to improve the performance of word processors or personal computers, there have been strong demands for miniaturization, improvement in visibility, and increase in the efficiency of the conversion of power to luminance thereof.

SUMMARY OF THE INVENTION

In view of the foregoing, an object of this invention is to provide a back lighting device which, with respect to its external dimensions, is highly improved both in the effective light emitting area and in the efficiency of converting power to luminance.

The inventors have conducted research on the structure of a back lighting device which is in the vicinity of a linear light source, and on the distribution of luminance of the light emerging surface of the light conducting plate, and found the following fact: when the junction of the end portion of the reflecting plate, or film, and the light conducting plate is in a certain state, the back lighting devices effective light emitting area is largest with respect to its external dimensions, and the conversion efficiency of power to luminance conversion is highest.

On the above-described finding, the foregoing object of the invention has been achieved by the provision of a back lighting device for a panel which comprises a light conducting plate made of a light-transmissive material, the light conducting plate having a light diffusing function and covering the rear surface with a specular or light diffusing/ reflecting plate or film, and a linear light source provided in proximity to the end portion of at least one side of the light conducting plate; in which, according to the invention, one of the end portions of a specular or light diffusing/reflecting plate or film covering the linear light source is bonded to the end portion of the light conducting plate, on the side of a light emerging surface of the light conducting plate, in proximity to which the linear light source is provided, and a light diffusing/reflecting plate or film is provided through an air layer on a part of the rear surface of the light conducting plate which corresponds to the end portion thus bonded.

BRIEF DESCRIPTION OF THE DRAWING(S)

FIG. 1 is a perspective view outlining the structure of a back lighting device, which constitutes an embodiment of this invention.

FIG. 2 is a sectional view of the device shown in FIG. 1.

DETAILED DESCRIPTION OF THE PREFERRED EMBODIMENTS

Figure 3:
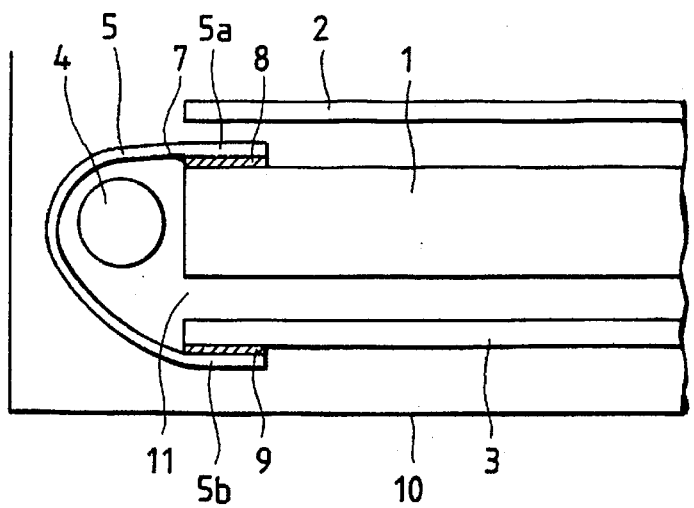
FIG. 3 is an explanatory diagram showing the arrangement of a light diffusing/reflecting plate covering a linear light source, and one end portion of a light conducting plate in the back lighting device of the examples 1 and 2 according to the invention.

This invention will be described with reference to the accompanying drawings.

FIGS. 1 and 2 are a perspective view and a sectional view showing an embodiment of the invention. In those figures, reference numeral 1 designates a light conducting plate, which is made of a material which transmits light with high efficiency, such as quartz, glass, transmissive natural or synthetic resin (for instance acrylic resin); and 2, a light diffusing plate which transmits light from the surface (front surface) of the light conducting plate 1 by diffusing it. In the invention, at least one light diffusing plate 2 is employed.

One large surface of the light conducting plate 1 has a light diffusing function. This function is given, for instance, by printing dots on the surface of the light conducting plate with paint or printing ink containing light scattering material such as $SiO_2$, $BaSO_4$ or $TiO_2$. Alternatively, the light diffusion function can be given by roughening the surface of the light conducting plate, or boring small holes, or forming small protrusions on it as indicated at 6 in FIG. 2, or the function is given by dispersing a high scattering material such as air, $SiO_2$, $BaSO_4$, $TiO_2$, or a polymer in the light conducting plate.

A specular or light diffusing/reflecting plate 3 is provided in such a manner as to cover substantially all of the rear surface of the light conducting plate. Linear light sources are designated by reference numeral 4. Preferably, the linear light sources 4 are so arranged along the end faces of the light conducting plate so that the central axes thereof parallel with the end faces of the light conducting plate 1 to allow light therefrom to enter the latter. In addition, the surfaces of the linear light sources 4, except for the portions facing the end faces of the light conducting plate, are covered with specular or light diffusing/reflecting plates or films 5, respectively.

In the invention, an example of a specular reflecting plate or film 5, which may be employed as the specular or light diffusing/reflecting plate or film 5, is formed as follows. That is, it is formed of a material of silver, aluminum, platinum, nickel or chromium which provides a specular-reflection of light; preferably a plastic film such as a polyester film is coated with silver or aluminum by vacuum deposition or sputtering. Employment of the specular reflecting plate or film 5 high in specular reflectivity (for instance, silver has a specular reflectivity of 90 to 95%) and small in thickness (for instance about 75 μm in the case where a layer of silver is formed on a commercially available polyester base by vacuum deposition) makes it possible to increase the efficiency of converting power to luminance, and to reduce the thickness of the linear light source sections which, heretofore, are larger than that of the light conducting plate section. The efficiency of converting power to luminance can be further increased when the method which has been filed by the inventors (Japanese Patent Application No. 67699/1991) is employed in combination with the above.

In one example of the light diffusing/reflecting plate or film 5 covering the linear light source 4, a light diffusing material (such as $SiO_2$, $BaSO_4$ or $TiO_2$) is mixed in a resin such as polyester resin having a light diffusing/reflecting characteristic. In another example, a light diffusing function is provided by foaming a resin such as polyester resin. In another example, an aluminum plate is coated with the above-described light diffusing material. That is, the light diffusing/reflecting plate or film 5 is not limited in its material; all that is necessary for the plate or film is to be able to sufficiently diffuse and reflect light.

The junction of the end portion 5a of the specular or light diffusing/reflecting plate or film 5 covering the linear light source 4 and the light conducting plate 1 is as shown in FIG. 3, in which a specific feature of the invention resides. More specifically, one end portion 5a, of the plate or film 5 covering the linear light source 4, on the light emerging surface side of the light conducting plate 1, is bonded to a part of the light emerging surface at the end of the light conducting plate 1 with double coated tape or an adhesive agent 8. However, the rear surface of the light conducting plate 1, which is at least opposite to the surface to which the one end portion of the plate or film 5 has been bonded, is covered through an air layer 11 with a light diffusing/reflecting plate or film 3. The above-mentioned structure is accommodated in a plastic case 10.

The other end portion 5b of the specular or light diffusing/reflecting plate or film 5 covering the linear light source 4 (which is opposite to the one end portion 5a which has been bonded to the end portion of the light conducting plate 1), for example, is bonded to the outer surface (which does not face the light conducting plate) of the light diffusing/reflecting plate or film 3, as indicated at 9 in FIG. 3, is not bonded to the light conducting plate 1 or film 3, or is held with an external support means, so that the plate or film 5 surrounds the linear light source 4.

The bottom surface of the light conducting plate 1 except the part covered through the air layer with the light diffusing/reflecting plate or film 5, may be covered with a light diffusing/reflecting plate or film 3 or a specular reflecting plate or film 3.

The light diffusing/reflecting plate or film 3 may be any one which is able to diffuse and reflect light as was described above. That is, it may be formed by mixing a light diffusing material in a resin, such as polyester resin, or foaming a resin, such as polyester resin, to have a light diffusing function. Alternatively, it may be an aluminum plate coated with the above-described light diffusing material. That is, the plate or film 3 is not limited in its material; all that is necessary for the plate or film 3 is to be able to sufficiently diffuse and reflect light applied thereto.

The specular reflecting plate or film 3 is of a material such as sliver and aluminum.

The air layer 11 formed between the rear surface of the light conducting plate 1 and the light diffusing/reflecting plate or film 3 is not particularly limited in thickness. However, in order to reduce the thickness of the back lighting device, the thickness of the air layer should be minimized, preferably 0.5 mm or less. That is, the minimum thickness may be such that air molecules are present in the form of a monomolecular layer.

The junction (as indicated at 8 in FIG. 3) of the end portion of the specular or light diffusing/reflecting plate or film 5 and the light conducting plate 1 should be wide enough to be high in mechanical strength; however, it is preferable that the width be as small as possible.

The linear light source 4 may be a fluorescent tube, a tungsten incandescent tube, an optical rod, or an LED array. Of those, the fluorescent tube is most suitable as the linear light source 4. In order to make the effective light emitting area uniform in the distribution of luminance, and to use electric power economically, it is preferable that the linear light source's 4 uniform light emission section, except the electrode section, be substantially equal in length to the end portion of the light conducting plate 1, near which the linear light source 4 is set.

The back lighting device of the invention, with the essential components designed as described above, is to be used with display panels, particularly with liquid-crystal display panels. It is preferable that the back lighting device has the following constitutional features:

The light diffusing material as indicated at 6 in FIG. 2 is formed in a dot pattern on the surface of the light conducting plate 1. The dots may be of any shape, circles or rectangles or cross lines. Those dots are formed in a grid pattern, with each dot being located at the point where any two imaginary lines are crossed at right angles. Adjacent crossed lines are preferably spaced apart by 0.5 to 3 mm, preferably 0.8 to 2 mm, with an appropriate distance being selected in accordance with the thickness of the light conducting plate 1.

In addition, the surface of the light conducting plate 1 is covered with the light diffusing material in such a manner that the coverage percentage is preferably 1 to 50% in the areas which are near the linear light sources 4, and 20 to 100% in the area that is the farthest from the light sources 4. Preferably, the light conducting plate 1 is covered with the light diffusing material in such a manner that the coverage percentage increases gradually with the distance from the light source 4 starting at the point where the linear light source 4 is placed in proximity to the end portion of the one side of the light conducting plate 1. The term "coverage percentage" as used herein is intended to mean the rate in area of the light scattering material to the surface of the light conducting plate 1.

The back lighting device of the invention is small in size, large in effective light emitting area with respect to its external dimensions, and excellent in the distribution of luminance. Hence, it can be used as a back lighting device that is highly efficient in converting power to luminance.

CONCRETE EXAMPLES AND COMPARATIVE EXAMPLES

As conducive to a full understanding of the invention, its concrete examples and comparative examples will be described below. The concrete examples relate to preferred embodiments, and the comparative examples relate to similar structures, but which do not provide results as desirable as the structures of the concrete examples.

A rectangular acrylic plate (205 mm×160 mm) having a thickness of 4 mm ("Delaglass (phonetic) A" manufactured by Asahi Kasei K.K.) as shown in FIG. 1 was provided. A cold-cathode fluorescent tube 4 (a normal tube of Harrison Denki K.K.) having a diameter of 3.8 mm and a length of 230 mm was set along each of the ends, in the longitudinal direction, of the rectangular acrylic plate 1. As shown in FIG. 2, each fluorescent tube 4 was surrounded by a silver film 5 in such a manner that the silver film 5 had a slit which was 4 mm in width and faced the end face of the light conducting plate 1, so that light emerging through the slit was allowed to enter the rectangular acrylic plate 1 (used as the light conducting plate) through the end face.

An ink containing a light diffusing material (titania) was applied to the surface of the rectangular acrylic plate 1 (used as the light conducting plate) by screen-printing a pattern of circular dots with a pitch of 1 mm. A screen-image carrier was prepared by CAD in such a manner that the coverage with the light diffusing material would be 20% at the point of a minimum value (near the linear light source), and 95% at the point of a maximum value (the middle of the light conducting plate), with the coverage being gradually increased from the minimum value to the maximum value in the intermediate area.

A white light diffusing/reflecting plate 3 of polyester 0.13 mm in thickness ("Merinex (phonetic) 329" of ICI Co.) was arranged to cover the entire surface of the rectangular acrylic plate 1 which was covered with the light diffusing material. A light diffusing plate 2 of polycarbonate 0.18 mm in thickness ("8B36" of GE Co.) was arranged to cover substantially the whole of the light emerging surface of the rectangular acrylic plate 1 while its roughened surface set opposite to the rectangular acrylic plate 1.

The cold-cathode tube 4 was driven by a constant current (a tube current of 5 mA) with an AC voltage being applied from an invertor, and the surface luminance produced thereby was measured with a luminance meter (Topcon BM-8).

Concrete Example 1

As shown in FIG. 3, the end portion 5a of the specular reflecting film 5 (the Ag film covering the light source 4), on the side of the light emerging surface of the light conducting plate 1, was bonded to a part of the light emerging surface of the light conducting plate 1 with a double coated tape having a width of 3.5 mm and a thickness of 0.16 mm (WPT-No 750F of Teraoka Seisakusho K.K) as indicated at 8 in FIG. 3, and the part of the rear surface of the light conducting plate 1, which was opposite to the part bonded with the double coated tape 8, was covered with a light diffusing/reflecting film 3 through an air layer 11. In other words, the Ag film 5 was bonded (at (9)) to the surface of the light diffusing/reflecting plate 3 which was not facing the light conducting plate 1. In this case, the average luminance in the effective light emitting area was 1300 cd/m². The abnormal light emission occurring in the vicinity of the end portion 5a of the light conducting plate 1, on the side of the light emerging surface, to which the Ag film 5 was bonded terminated within 2 mm from the linear light source 4, and its maximum luminance was 1700 cd/m².

In the invention, the effective light emitting area is 204 mm×152 mm, being considerably large when compared with the light conducting plate 1 employed; that is, the region extending from a line 4 mm from the linear light source 4 may be employed as an effective light emitting region. In addition, with the fact taken into consideration that the double coated tape 8 is 3.5 mm in width, the region extending from a line 0.5 mm from the part where the Ag film 5 (used as the specular reflecting film) is laid on the light conducting plate 1 can be employed as an effective light emitting region.

In the prior art, the distance is disclosed as 5 to 10 mm instead of 0.5 mm as mentioned above. Thus, the effective light emitting region is sufficiently large with respect to the external dimensions.

Comparative Example 1

Figure 4:
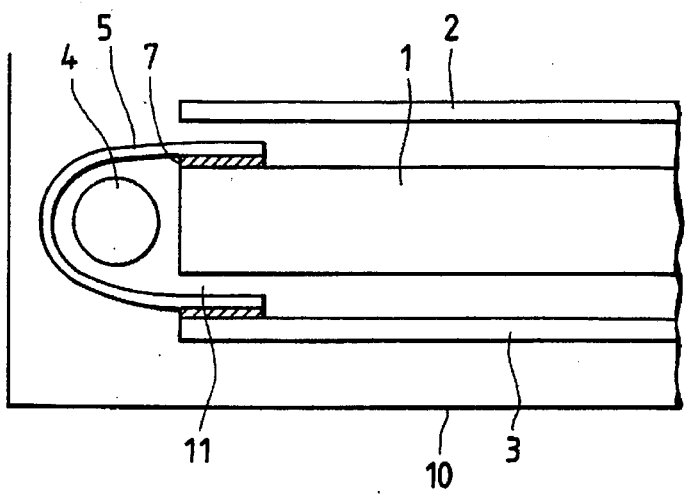
FIG. 4 is an explanatory diagram showing the arrangement of a light diffusing/reflecting plate covering a linear light source, and one end portion of a light conducting plate in the back lighting device of the comparative example 1.

As shown in FIG. 4, a back lighting device was formed which was equal in structure to the device of the above-described Concrete Example 1 except that the end portion 5b of the Ag film 5 is bonded to the part of the light diffusing/reflecting film 3 with the double coated tape 9 in such a manner that the part of the rear surface of the light conducting plate 1 was covered through an air layer by the Ag film 5 (with the Ag film 5 on the rear surface of the light conducting plate being substantially equal in area to the Ag film 5 on the front surface). In the comparative example, the average luminance was 1270 cd/m₂. The abnormal light emission occurring in the vicinity of the end portion 5a of the Ag film 5 (used as the specular reflecting film 5), on the side of the light emerging surface of the light conducting plate 1, terminated at about 6 mm from the linear light source 4, and its maximum luminance was 2400 cd/m².

With the light diffusing plate 2 peeled off, the abnormal light emitting region was observed obliquely, as a result of which the reason why the abnormal light emission occurred was found as follows. That is, light entering the light conducting plate 1 through its end face adjacent to the linear light source 4 is subjected to diffusion/reflection by the double coated tape as indicated at 8 in FIG. 3 through which the specular reflecting film 5 is bonded to the surface of the light conducting plate 1. That is, the double coated tape acts as a light diffusing element. Thus, the double coated tape as indicated at 8 in FIG. 3 itself emits light abnormally. The light thus emitted is reflected by the Ag film 5 (the specular reflecting film 5) on the side of the light conducting plate 1 which is opposite to the side where the double coated tape 8 is provided. The light thus reflected is returned to the vicinity of the double coated tape 8, where it is diffused and reflected. The light thus diffused and reflected forms an angle with the surface of the light conducting plate 1 which is smaller than a critical refractive angle, thus directly emerging from near the double coated tape 8. This is the reason why the abnormal light emission occurs.

In Concrete Example 1, the light from the double coated tape 8 is diffused and reflected by the light diffusing/reflecting plate 3 on the side of the light conducting plate 1 which is opposite to the side where the double coated tape 8 is positioned (in the diffusion/reflection, being different from the specular reflection, light is not regularly reflected; that is, light applied to the reflecting surface is reflected in many directions). Hence, the number of rays of light returned to the vicinity of the double coated tape 8 is small; that is, a larger part of the rays of light form angles with the surface of the light conducting surface which are larger than the critical refractive angle, thus contributing to improvement of the uniform planar light emission in the effective light emitting area.

Comparative Example 2

A back lighting device was provided which was equal in structure to the device of the above-described comparative example 1 except that the Ag film 5 on the rear surface of the light conducting plate 1 was painted black. The average luminance was 1265 cd/m₂.

In the vicinity of the end portion of the specular reflecting film on the side of the light emerging surface of the light conducting plate, no abnormal light emission occurred, and the luminance was low. The region low in luminance terminated at about 6 mm from the linear light source, and its minimum luminance was 850 cd/m₂.

Comparative Example 3

A back lighting device was provided which was equal in structure to the device of the above-described comparative example 1 except that, before the Ag film 5 was bonded to a part of the light emerging surface of the light conducting plate 1, the part was painted black. In this case, the average luminance was 1000 cd/m². In the vicinity of the end of the specular reflecting film 5 on the side of the light emerging surface of the light conducting plate 1, no abnormal light emission occurred, and the luminance was low. The region low in luminance terminated at about 6 mm from the linear light source, and its minimum luminance was 550 cd/m₂.

Comparative Example 4

A back lighting device provided was such that the device of the above-described comparative example 1 was so modified that the Ag film 5 was bonded to both surfaces of the light conducting plate 1, and it was equal in the remaining arrangement to the device of the above-described concrete example 1. In this case, the average luminance was 1200 cd/m². The abnormal light emission in the vicinity of the end of the specular reflecting film 5 on the side of the light emerging surface of the light conducting plate 1 terminated at about 8 mm from the linear light source 4, and its maximum luminance was 2700 cd/m².

Comparative Example 5

A back lighting device was provided which was equal in structure to the device of the above-described concrete example 1 except that the end portion 5a as indicated at 8 in FIG. 3 of the Ag film 5, on the side of the light emerging surface of the light conducting plate 1, was supported by an iron plate 1 mm in thickness, 3 mm in width and 240 mm in length instead of the use of the double coated tape 8 in such a manner that it was laid through an air layer on the light emerging surface of the light conducting plate. It was difficult to support it with the iron plate, and it was impossible to accurately measure the average luminance. The abnormal light emission in the vicinity of the end of the specular reflecting film on the side of the light emerging surface of the light conducting plate changed with the pressure applied through the iron plate.

In order to miniaturize the back lighting device, the plate was pushed from both sides; however, the pressure was insufficient at the middle, and the abnormal light emission occurred in a range of from 5 mm to 10 mm from the linear light source, and its maximum luminance was 5000 cd/m². The plate was not suitable for miniaturization of the back lighting device, particularly for reduction of the thickness.

Concrete Example 2

As shown in FIG. 3 a back lighting device was prepared which was equal in structure in the device of the above-described concrete example 1 except that each light source 4 was covered with a light diffusing/reflecting film 5 ("Merinex (phonetic) 329" of ICI Co.) instead of using the Ag film 5. One end portion 5a of the light diffusing/reflecting film 5, on the side of the light emerging surface of the light conducting plate 1, was bonded to a part of the light emerging surface of the light conducting plate 1 with a double coated tape 3.5 mm in width and 0.16 mm in thickness (WPT-No 750F of Teraoka Seisakusho K.K.) as indicated at 8. The remaining part was used to cover the light source 4. The other end portion 5b of the film 5 was bonded to the end portion of the rear surface of the light diffusing/reflecting film 3 covering the surface of the light conducting plate 1 which was partially covered with the light diffusing material, with the double coated tape as indicated at 9, in such a manner that the front surface of the light diffusing/reflecting film 3 faced the light conducting plate 1, and the light diffusing/reflecting film 3 was laid through an air layer 11 on the light conducting plate. The luminance of the device was measured. The average luminance of 99 points (uniformly distributed) in the effective light emitting area was 1300 cd/m². The abnormal light emission in the vicinity of the end portion of the light diffusing/reflecting film 5, on the side of the light emerging surface of the light conducting plate 1, terminated within 2 mm from the linear light source 4, and its maximum luminance was 1700 cd/m².

Comparative Example 6

Figure 5:
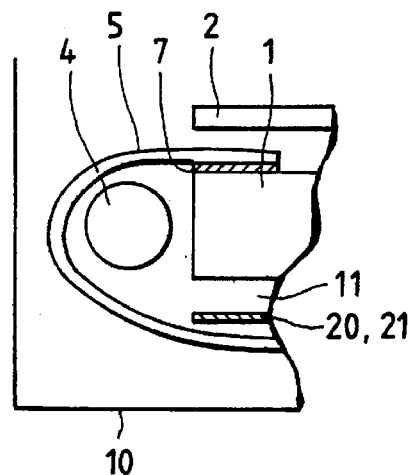
FIG. 5 is an explanatory diagram showing the arrangement of a light diffusing/reflecting plate covering a linear light source, and one end portion of a light conducting plate in the back lighting device of the comparative examples 6, 7 and 8.

As shown in FIG. 5, a back lighting device was prepared which was equal in structure to the device of the above-described concrete example 2 except that the part of the rear surface of the light conducting plate 1 which faced the junction of the end portion 5b of the light diffusing/reflecting film 5 and the surface of the light conducting plate 1 was covered through an air layer with a specular reflecting film 20 (an Ag film manufactured by Nakai Kogyo K.K.). The average luminance was 1270 cd/m². The abnormal light emission in the vicinity of the end portion of the light diffusing/reflecting film 3, on the side of the light emerging surface of the light conducting plate 1, terminated at about 6 mm from the linear light source 4, and its maximum luminance was 2400 cd/m².

With the light diffusing plate 2 peeled off, the abnormal light emitting region was observed obliquely, as a result of which the reason why the abnormal light emission occurred was found as follows: That is, the light entering the light conducting plate 1 through the end face adjacent to the linear light source 4 is subjected to diffusion/reflection by the double coated tape, through which the light diffusing/reflecting film 5 is bonded to the surface of the light conducting plate 1. That is, the double coated tape 8 acts as a light diffusing element. Thus, the double coated tape itself emits light abnormally. The light thus emitted is regularly reflected by the specular reflecting film 20 on the side of the light conducting plate 1 which is opposite to the side where the double coated tape 8 is provided. The light thus reflected is returned to the vicinity of the double coated tape, where it is diffused and reflected. Therefore, the light forms an angle with the surface of the light conducting plate which is smaller than a critical refractive angle, thus directly emerging from near the double coated tape. This is the reason why the abnormal light emission occurred.

In Concrete Example 2, light from the double coated tape 8 is diffused and reflected by the diffusing/reflecting plate 3 on the side of the light conducting plate 1 which is opposite to the side where the double coated tape 8 is positioned (in the diffusion/reflection, being different from the specular reflection, light is not regularly reflected; that is, light applied to the reflecting surface is reflected in many directions). Hence, the number of rays of light returned to the vicinity of the double coated tape is small, which contributes to improvement of the uniform planar light emission in the effective light emitting area.

Comparative Example 7

As shown in FIG. 5, a back lighting device was provided which was equal in structure to the device of the above-described concrete example 2 except that the part of the rear surface of the light conducting plate 1 which faced the part of the front surface to which the double coated tape 8 was bonded was covered with a black film 21 through an air layer. The device was subjected to luminance measurement.

The average luminance was 1265 cd/m². In the vicinity of the end portion of the light diffusing/reflecting film 5, on the side of the light emerging surface of the light conducting plate 1, no abnormal light emission occurred, and the luminance was low. The region low in luminance terminated at about 6 mm from the linear light source, and its minimum luminance was 850 cd/m₂.

Comparative Example 8

As shown in FIG. 5, a back lighting device was provided which was equal in structure to the device of the above-described comparative example 6 except that the junction of the light diffusing/reflecting film 5 and the light conducting plate 1 was painted black. As a result of a luminance measurement given to the device, the average luminance was 1000 cd/m². In the vicinity of the end portion of the light diffusing/reflecting film, on the side of the light emerging surface of the light conducting plate, no abnormal light emission occurred, and the luminance was low. The region low in luminance terminated at about 6 mm from the linear light source, and its minimum luminance was 550 cd/m₂.

Comparative Example 9

A back lighting device provided was such that the device of the above-described comparative example 6 was so modified that the part of the specular reflecting film 20 was bonded to the light conducting plate 1, and it was equal in the remaining arrangement to the device of the above-described concrete example 2. The average luminance was 1200 cd/m². The abnormal light emission in the vicinity of the end portion 5a of the light diffusing/reflecting film 5, on the side of the light emerging surface of the light conducting plate, terminated at about 8 mm from the linear light source, and its maximum luminance was 2700 cd/m².

Comparative Example 10

A back lighting device was provided which was equal in structure to the device of the above-described concrete example 2 except that the end portion of the light diffusing/reflecting film 5, on the side of the light emerging surface of the light conducting plate 1, was laid through an air layer on the light emerging surface of the light conducting plate without the double coated tape, and the junction of them was supported with an iron plate 1 mm in thickness, 3 mm in width and 240 mm in length. In practice, it was difficult to support the junction with the iron plate, and it was impossible to measure the average luminance accurately. The abnormal light emission in the vicinity of the end portion of the light diffusing/reflecting film 5 on the side of the light emerging surface of the light conducting plate 1 changed with the pressure applied through the iron plate.

In order to miniaturize the back lighting device, the plate was pushed from both sides; however, the pressure was insufficient at the middle, and the abnormal light emission occurred in a range of 5 to 10 mm from the linear light source, and its maximum luminance was 5000 cd/m². Thus, the plate was not suitable for miniaturization of the back lighting device, particularly for reduction of the thickness.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A back lighting device for a panel, comprising:

a light conducting plate made of a light-transmissive material, and having a light emerging surface and back surface opposed thereto;

a light diffusing element formed on the back surface of the light conducting plate;

a specular or light diffusing/reflecting plate or film covering the light diffusing element and the back surface of the light conducting plate;

a linear light source disposed in proximity to at least one side face of the light conducting plate;

a light reflecting plate or film covering the linear light source, one end portion of the light reflecting plate or film being attached to the light emerging surface of the light conducting plate at its end portion in proximity to the linear light source; and a light absorbing element spaced from said light conducting plate by an air layer, said light absorbing element disposed proximate to the back surface of the light conducting plate in an area corresponding to where the one end portion of the light reflecting plate or film is attached to said light conducting plate.

2. The back lighting device of claim 1, wherein the light reflecting plate or film is a specular reflecting plate or film.

3. The back lighting device of claim 1, wherein the one end portion of the light reflecting plate or film is bonded to the light emerging surface of the light conducting plate.

* * * * *